United States Patent [19]

Welch

[11] Patent Number: 5,361,642
[45] Date of Patent: Nov. 8, 1994

[54] COLUMN-BASED STRESS GAUGE

[75] Inventor: Charles R. Welch, Vicksburg, Miss.

[73] Assignee: The United States of America as represented by the Secretary of the Army, Washington, D.C.

[21] Appl. No.: 100,948

[22] Filed: Aug. 3, 1993

[51] Int. Cl.$^5$ .............................................. G01L 1/04
[52] U.S. Cl. ......................... 73/862.632; 73/768; 73/774
[58] Field of Search ............... 73/862.632, 862.635, 73/862.642, 862.68, 862.044, 862.045, 763, 768, 774

[56] References Cited

U.S. PATENT DOCUMENTS

| | | | |
|---|---|---|---|
| 2,992,556 | 7/1961 | Webster | 73/862.632 X |
| 3,529,468 | 9/1970 | Carlson | 73/768 X |
| 3,696,317 | 10/1972 | Farr | 73/862.632 X |
| 4,092,856 | 6/1978 | Kanda | 73/781 |
| 4,493,220 | 1/1985 | Carignan et al. | 73/862.635 X |
| 4,770,049 | 9/1988 | Jones et al. | 73/862.635 |

OTHER PUBLICATIONS

Rickman et al. "Procedure for Assembling WES Column Based Soil Stress Gage", Instruction Report SL-8-6-1, Sep. 1986, pp. 1-B3.U.S. Army Rpt.
Joachim et al. "Design and Field Experience with WES 10KBAR Airblast and Soil Stress Gage", *The Shock & Vibration Bulletin* Jun. 1985 pp. 135-146.

Primary Examiner—Richard E. Chilcot, Jr.
Assistant Examiner—Elizabeth L. Dougherty
Attorney, Agent, or Firm—Luther A. Marsh

[57] ABSTRACT

The present invention provides a free field stress gauge that can operate in a medium with ambient normal stress fields up to 10 kilobars. The invention uses two machined parts, a top annulus cover disc portion and an active bottom disc portion such that the annulus top cover disc covers the active bottom disc portion but allows a solid central sensing column to be exposed to ambient conditions. The disc portions have a dual sealing means to protect the strain gauges therein from fluid ingress. The gauge is suitable for measuring stresses of soil and rock formations as well as concrete, asphalt or other materials in either a static or dynamic regime. The stress gauge is designed for high uni-axial stress measurements, improved frequency response, have low hysteretic induced effects in measurements and be a thinner gauge.

13 Claims, 6 Drawing Sheets

COLUMN-BASED STRESS GAUGE

STATEMENT OF GOVERNMENT INTEREST

The invention described herein may be manufactured and used by or for the Government of the United States of America for governmental purposes without the payment of any royalties thereon.

FIELD OF THE INVENTION

This invention relates to stress gauges, and more particularly to free-field stress gauges capable of dynamic or static response measurements in geological rock and soil formations, concrete, asphalt or other materials. The gauge design is especially durable and robust for measuring transient stresses associated with the strong motions caused by explosions. The gauge can also be incorporated and measure static stresses in smart structures such as bridges, buildings or roads.

BACKGROUND OF THE INVENTION

Free field stress gauges defined herein are gauges used to measure stresses in the medium in which they are used by physically embedding them in the sensed medium, e.g. a geological rock and/or soil formation, and in civil engineered structures such as roads or buildings. Specific applications of this sensor include use in passive smart structures to assess the state of a civil engineered structure in real time such as a skyscraper's pilings in an an earth quake prone area. Additional uses include placement in a road for traffic light control.

The current invention is an improvement over two known earlier free field stress gauges.

The gauge taught by Richard Kanda's U.S. Pat. No. 4,092,856 entitled "Kilobar Range Stress Gauge," which is hereby incorporated by reference, teaches of a concentric hollow ring central sensing column in a first embodiment and a central sensing column in a second embodiment. Another gauge by U.S. Army Corps of Engineers Waterway Experiment Station Technical Instruction Report SL-86-1, dated September 1986, entitled "Procedure for Assembling WES Column-Based Soil Stress Gages" (referred to as COE 86 gauge) teaches of a soil stress gauge that is capable of both static and dynamic stress measurements up to 50 ksi in various types of soil.

Kanda's '856 gauge teaches of a stress gauge designed to match the density and Young's modulus of the surrounding medium and operate up to one kilobar stress ranges. The instant invention's gauge material approximately matches the density of the sensed medium, and is also intentionally designed to have an average elastic Young's modulus in the direction of its measuring axis that is higher than the surrounding sensed medium resulting in a higher ratio of support area to loaded area for a preferred axial orientation of the gauge. This in turn results in a gauge with much higher measuring ranges in comparison with the Kanda's '856 gauge. For example, the present invention can be fabricated from 4340 alloy steel, that is heat treated to a yield strength of 199,000 psi and operate in ranges of approximately 145,000 psi (10 kilobars).

Another limitations of the Kanda's '856 gauge is it's required matching of the Young's modulus of the sensed medium with that of the gauge which results in limited applicability to sensed medium that are linear elastic, i.e. sensed mediums where Young's modulus of elasticity is also constant. The instant invention's gauge differs in that it uses the fact that inclusions of relatively high Young's modulus in sensed mediums of relatively low Young's modulus over-register the free field stress by almost constant ratio. Thus, if the surrounding sensed medium's Young's modulus varies during loading or unloading, then the instant invention's gauge will provide continuous accurate monitoring of the free field stress via an "over-registration" or calibration factor, with only the constraint that the sensed medium's Young's modulus remain less than the present invention's gauge.

Yet another inherent limitation of Kanda's '856 gauge design is its structure having a Young's modulus equal to the sensed medium which in turn limits its useful applications. The instant invention's gauge design requires only a single gauge design for sensing stress in a great number of diverse media without regard for a uniformity of the gauges Young's modulus with that of the sensed medium.

Another limitations of the Kanda's '856 gauge includes the type of unspecified stress gauges used in the Wheatstone bridge electrical circuit which affects the gauge's longitudinal (axial) and circumferential strain sensitivity. Kanda does not discriminate as to the type of strain gauge that should be used. The present invention uses a combination of semi-conductor strain gauges for measuring longitudinal strains and foil type strain gauges for measuring circumferential strains on the sensing column for greater gauge sensitivity to normal stress, and reduced sensitivity to lateral stress. Additionally, the COE 86 gauge uses strictly semi-conductor gauges which is a disadvantage since the improved longitudinal (axial) sensitivity to circumferential sensitivity is not achieved.

Still another limitation of the Kanda's '856 and the COE 86 gauge are that the actual sensing column is entirely within the cover disc which requires these devices have very tight machining tolerances in order for the active disc and cover disc to cooperate properly for proper gauge operation. Additionally, the sealing means between these disc is not as effective as the present invention's when under intense dynamic loading where harmful fluids can ingress into the central gauge areas where electrical connections and strain gauges are located and cause failure. The present invention obviates these problems by having a portion of the sensing column protrude through the gauge cover and makes direct contact with the ambient sensed medium. Moreover, the invention herein includes a positive double watertight sealing means between the top cover disc and the bottom active disc whose sealing quality is enhanced when the gauge is loaded. Thus, the invention's design obviates the need for high machine tolerances in its manufacture and allows for greater gauge reliability compared to previous gauges.

Yet still another limitation of the Kanda's '856 gauge and the COE 86 gauge is their increased hysteretic effects due to the sensing column of both these gauges being entirely within the cover disc and loading on the column is indirectly effected by normal stresses of the surrounding medium acting on the cover disc where reseating of the gauge parts occurs after the gauge is loaded. In contrast, the present invention obviates this effect by having most of the top loaded area of the sensing column directly exposed to the sensed medium. The portions of the sensing column's top loading area which are not in direct contact with the sensed medium, are also connected to the sensed medium via relatively flexible members.

Yet another limitation of the Kanda's '856 gauge and the COE 86 gauge is caused by their respective gauge geometries which limits the elastic range of use. Kanda's '856 gauge is limited to fields of around one kilobar, i.e. 15,000 psi range for aluminum alloy 7075-T6. The present invention's gauge design allows for gauge elastic range to be quite high, of around 70 percent or more of the elastic range (in compression) Of the material used for gauge construction, which translates into operating capabilities of up to 10 kilobar range of measurements as discussed above.

Still another limitation of the Kanda's '856 gauge and the COE 86 gauge is the way signal wires are routed through and supported by their gauge's active disc structure. With acceleration induced flexure that occurs during explosive tests, gauge failure often occurs due to severed sensing wires or interconnection failures. The present invention resolves such problems by providing tight and well-supported sensing wires and filling voids inside the gauge body with a light-weight stabilizing strong material that further supports the internal signal wires, strain gauges, solder joints and tabs from inertial loading.

Yet still another limitation of the COE 86 gauge is its large size which affects time and the frequency response capabilities during transient operation. One aspect of the present invention has proportionally reduced diameter and thickness by approximately 20 percent compared to the COE 86 gauge while still having the desired diameter-to-thickness ratio of five or better as required for free field stress gauges, see the article by Peattie et al. entitled "The Fundamental Action of Earth Pressure Cells," in *Journal of the Mechanics and Physics of Solids*, 1954, Vol. 2, pp. 141–55. The present invention reduces required gauge size which allows the gauge to be used in small areas, reduces the volume over which the stress field is perturbed by the presence of the gauge itself, and provides a gauge which has a higher frequency response.

SUMMARY OF THE INVENTION

The present invention provides a free field stress gauge that can operate in a medium with ambient normal stress fields of the order of 10 kilobars. The invention uses two machined parts, a top annulus cover disc portion and active bottom disc portion, such that the annulus top cover disc inserts and covers electrically sensitive areas of a complimentary fitting active bottom disc portion but allows for the solid central sensing column to be exposed to ambient conditions. In between the top and bottom disc portions, there is a dual watertight sealing means to protect the strain gauges therein. Furthermore, the internal wiring of the gauge is potted to stabilize the internal electrical components during high acceleration flexure. Since the present invention's average modulus need only be higher than the modulus of the sensed medium, a single embodiment of the present gauge can measure in diverse linear and nonlinear media.

OBJECTS OF THE INVENTION

Accordingly, several objects and advantages of the present invention are:

(a) To provide a free field stress gauge that can accurately operate in normal stress fields up to the ten kilobar range;

(b) To provide a free field stress gauge that inherently reduces lateral sensitivity due to its geometrical design;

(c) To provide a free field stress gauge that is thinner and has a smaller diameter, but with a proper aspect ratio that allows for better frequency response from the gauge;

(d) To provide a free field stress gauge that is less hysteretic;

(e) To provide a free field stress gauge that is more durable due to better watertight sealing means and internal stabilization of the electrical connections within gauge for improved reliability;

(f) To provide a free field stress gauge that has a design of a single preferred embodiment that can make proper measurements in media with diverse Young's moduli;

(g) To provide a free field stress gauge that will function in linear and nonlinear media; and (h) To provide a free field stress gauge that requires less stringent machine tolerances in its fabrication.

Still further advantages will become apparent from a consideration of the ensuing detailed description and drawings.

DETAILED DESCRIPTION

Figure 1A:
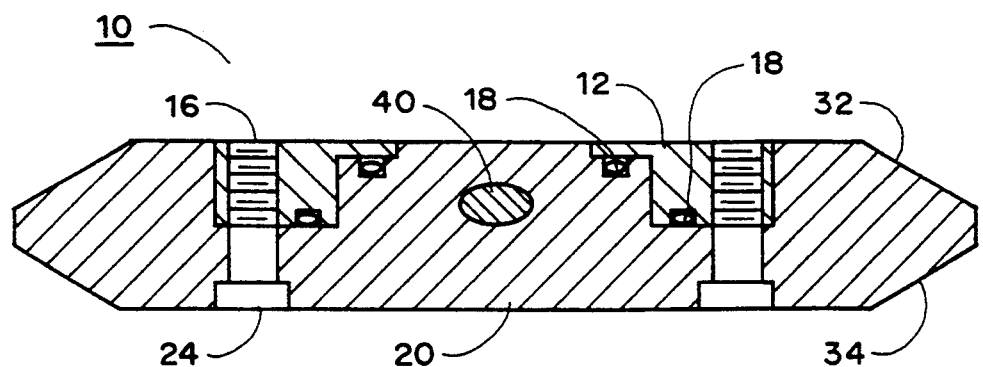
FIG. 1a shows a cross-sectional view of the column based stress gauge with both top cover disc secured to the bottom active disc.
Figure 1B:
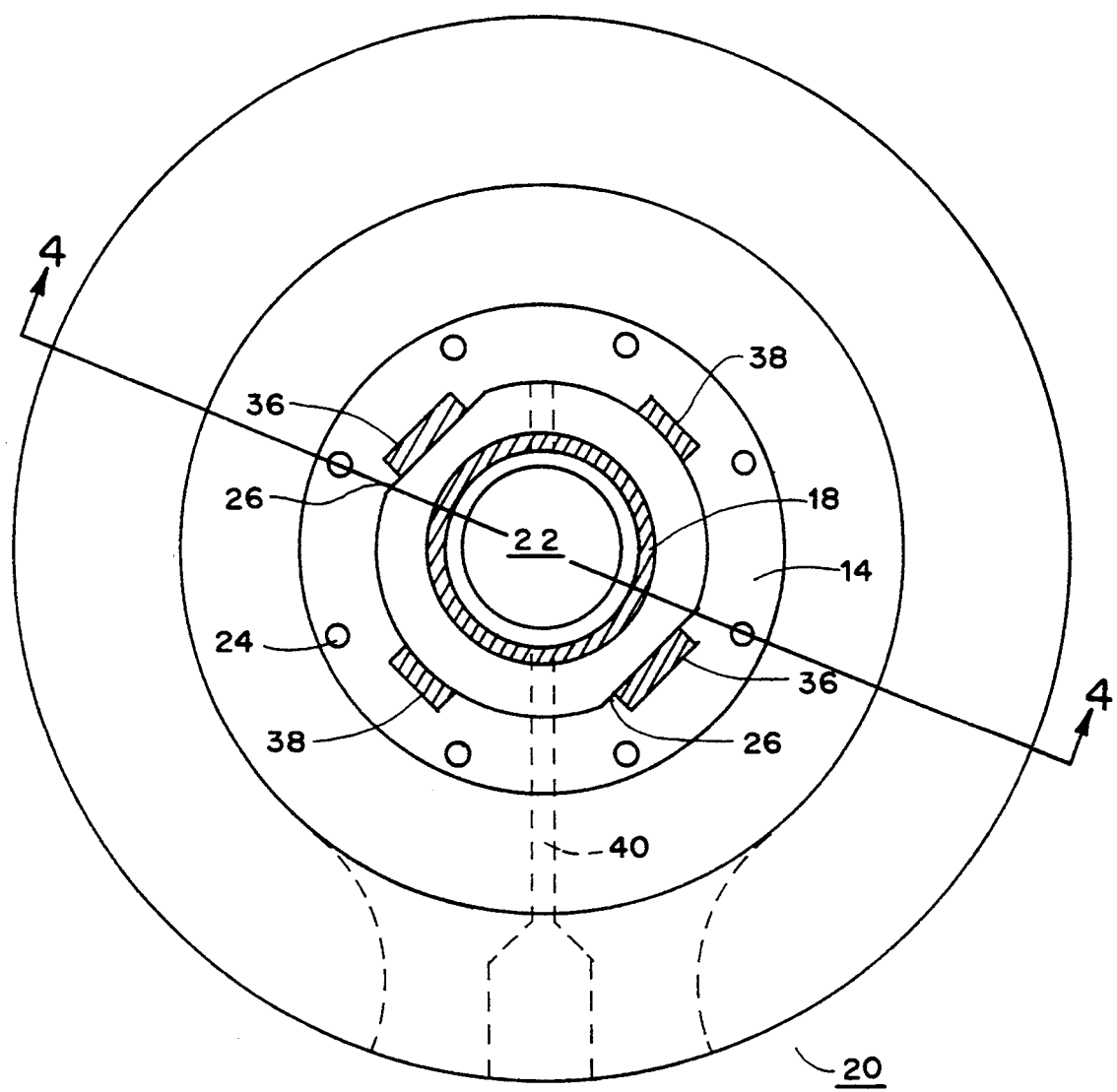
FIG. 1b shows a top view of the bottom active disc.
Figure 1C:
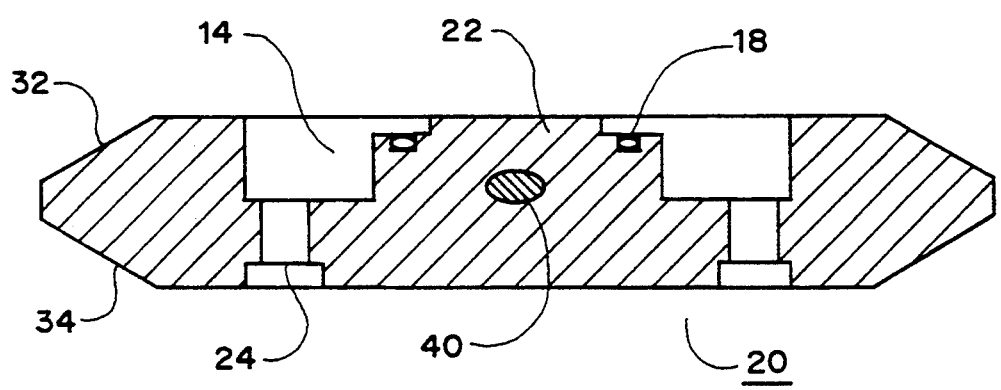
FIG. 1c shows a cross-sectional view of the bottom active disc.

FIG. 1a–1e shows a free field stress gauge (10). The gauge (10) comprises two machined parts; i.e. a top annulus cover disc (12) and a bottom active disc (20). The choice of material construction is dependent upon the ambient medium in which it is used to measure stress. The gauge's selected material approximately matches the density of the sensed medium, and also have an average elastic Young's modulus in the direction of its measuring axis that is higher than the surrounding measured medium which results in a higher ratio of support area to loaded area for a preferred axial orientation of the gauge. For example, in soil conditions, high-strength aluminum alloy 7075-T6 is typically used for stress measurements since aluminum has significantly higher Young's modulus elasticity than the soil, yet has a density only slightly higher than that of the soil. As another example, where the gauge is installed in rock formations, high-strength 4320 steel is typically used for the gauge material because of the requirement for higher Young's modulus of elasticity in comparison to that of the rock, and also due to the fact that steel affords a higher elastic range.

The gauge's bottom active disc (20) is machined from a single piece of material and consists of a solid central column (22) surrounded by a void annulus (14) in which the top annulus cover disc (12) which inserts into bottom active disc (20) and is secured into place by screws or bolts that pass through holes (24) in the bottom disc and fasten the top annulus disc in place. The solid column has two machined flats (26) on opposites sides of the column onto which semi-conductor strain gauges (36) are attached. A flat surface is beveled along the top edge of the central column (30). The top outside edge (32) of the bottom disc (20) is beveled at an angle of approximately 30 degrees over the complete surface. The bottom edge (34) of the bottom disc (20) is beveled at a similar angle of approximately 30 degrees over an arc of approximately 340 degrees.

The strain gauges (36) attached to the two machined flats (26) are preferably of the semi-conductor type to allow for improved sensitivity in measurements of longitudinal strains in the central column (22); e.g. semi-conductor strain gauges include those commercially available from Kulite Semi-Conductor Inc. Other strain gauges (38) are also attached at 90 degrees relative to the strain gauges (36) and are attached to the central column (22) on lateral surfaces that measure circumferential strains, also known as Poisson strains, in the central column (22). The preferred type of strain gauge for those placed on the lateral surfaces are commercially available foil type strain gauges; e.g. foil type gauges are available from Micro-Measurements Group Inc. The semi-conductor type strain gauge is approximately 60 times more sensitive then the foil type which in turn yields a stress gauge with improved longitudinal stress sensitivity along with reduced lateral stress sensitivity, while maintaining the advantages of a full Wheatstone bridge circuit. The strain gauges (36) and (38) are bonded to the central column (22) by epoxy.

Figure 2:
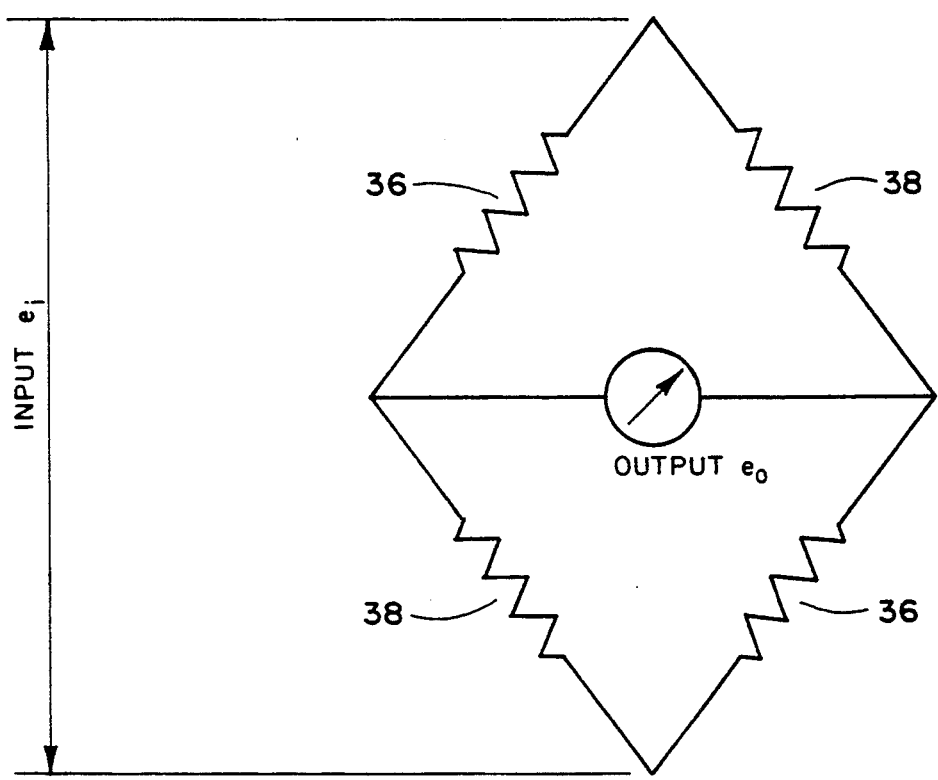
FIG. 2 shows a schematic of the Wheatstone bridge circuit used in the gauge.

The strain gauges (36) and (38) are electrically configured in a Wheatstone bridge electrical circuit as shown in FIG. 2. Two longitudinal strain gauges (36), and two circumferential gauges (38) are on opposite arms of the bridge. Electrical sensing and excitation leads pass through an internal passage (40) shown in FIG. 1b which runs transverse to and beneath the column in the lower portion of the active disc body (20) for connection to the strain gauges (36) and (38). An external strain gauge metering device shown as output $e_o$ in FIG. 2 also has sensing leads that pass through passage (40). The point of egress for the internal passage (40) is above the center of the non-beveled portion. At the point of egress of the electrical sensing and excitation leads from the stress gauge, the external hole is preferably enlarged and appropriate internal threads are machined to allow a secure attachment of steel tubing or other external conduit means for the strain gauge sensor's electrical sensing and excitation leads.

Figure 1D:
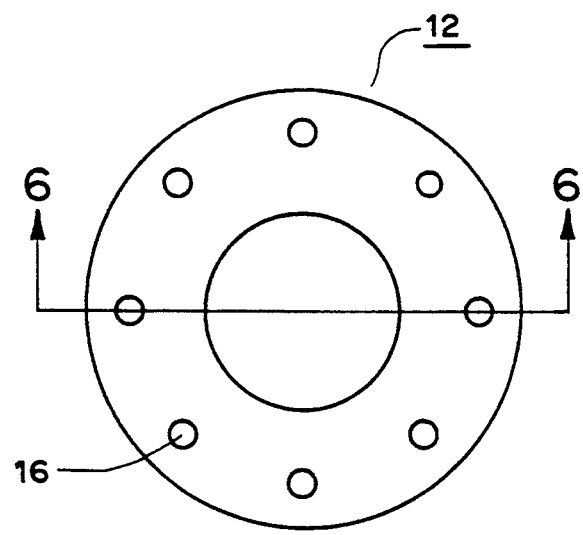
FIG. 1d shows a top view of the top cover disc.
Figure 1E:
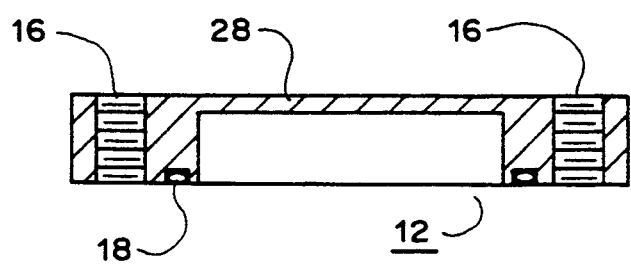
FIG. 1e shows a cross-sectional view of the top cover disc.

The top cover disc (12) as shown in FIG. 1d and FIG. 1e are preferably machined from a single piece of material into an annulus section underlying a flat washer section (28). When assembled as shown in FIG. 1a, the annulus section inserts into the annular void section (14) and the flat washer section overlays and contacts the flat beveled edge (30) of the central column (22) of the gauge active disc portion (20). Holes (16) are drilled and tapped through the top cover disc (12), near the outer edge. Screws or other fastening means pass through corresponding holes in the active disc (24) to secure the cover disc portion with the active disc portion.

Two water-tight seals (18), e.g. o-ring or copper washer seals, are used to provide initial sealing between the top cover disc (12) and the active disc (20). When the gauge is subjected to exterior pressures, these initial seals cause a pressure differential between the interior and exterior of the gauge which in turn yields a metal to metal contact between the top cover disc (12) and active disc (20); thus effecting better sealing at high loading pressures.

For dynamic stress environments in which the stress gauge is subjected to high accelerations, the interior of the gauge is completely filled with a relatively stiff but strong material of low density, e.g. Stycast Foam made by the Emerson and Cuming Inc., to stabilize strain gauge wires within the gauge body and solder tabs fixed relative to the gauge body. To facilitate introduction of this stabilizing material into the gauge body once gauge top disc and bottom disc are attached to each other, fill holes may be drilled into the gauge through either the annulus section of the top cover disc or through an appropriate section of the bottom active disc. Appropriate sealing mechanisms, e.g. flat-head cap-screws may be used to seal and fill the holes.

Other features of the gauge include the use of alternate materials used in the making of the gauge top disc (12) and bottom active disc (20). These materials include the use of glass, plastic, ceramic and composite materials. Additionally, the gauge top and bottom disc do not have to be made of the same materials for proper gauge operation.

Other sensing means may be used to sense deformations of the central column other then the electrical strain gauges (36) and (38) in a Wheatstone bridge circuit as described above. They include the use optical detection schemes where fiber-optical transmissions of light are used to transmit free field stress measurements by transduction of mechanical changes in gauge body (10) by use of structurally integrated fiber-optic strain gauge sensors that are placed in or on central column (22) in place of strain gauges (36) and (38). Thus, with stress induced in the central column, the fiber-optical strain gauge sensor effects changes in the optical path length which is detected as change in light intensity or phase-angle change.

Other possible variation of the gauge includes the use of inductance or capacitance detection schemes that transduce mechanical deformations where the gauge parts cause changes in inductance or capacitance characteristics of the monitored electrical circuit that the gauge forms a part thereof.

Although the description above contains many specificities, these should not be construed as limiting the scope of this invention but as merely providing illustrations of some of the presently preferred embodiments of this invention.

I claim:

1. A free field stress gauge for use in stress fields in a sensed medium up to and including the ten kilobar range, comprising:

a first disc having a solid central sensing column section in direct contact with the sensed medium, an internal passage for allowing sensing means to connect with strain gauge sensors mounted to the first disc, an annular void space between the central sensing column and an outer annular section whereby the annular void allows for the mating of a complimentary second disc, the sensing column has surfaces for placement of the strain gauge sensors;

the second disc and the first disc have at least two mutual recesses within their structures for placement of a watertight sealing means, the second disc is fastened to the first disc by fastening means; and detection means for sensing any stress applied to the free field stress gauge by measuring the strain experienced by the strain gauge sensors.

2. A free field stress gauge as defined in claim 1 wherein the number of the strain gauge sensors is four, a first and a second strain gauge sensor which sense longitudinal deformation and a third and a fourth strain gauge sensor which sense circumferential deformation; the first and second strain gauge sensors which sense longitudinal deformations are positioned on flattened sections of the sensing column, the third and fourth strain gauge sensors are positioned 90 degrees relative to the first and second strain gauge sensors on the sensing column of the first disc.

3. A free field stress gauge as defined in claim 2 wherein the first and second strain gauge sensors are of a semi-conductor strain gauge sensor type and the third and fourth strain gauge sensors are of a foil strain gauge sensor type.

4. A free field stress gauge as defined in claim 1 wherein a top outside edge and a bottom outside edge of the first disc is beveled at an angle of approximately 30 degrees and the first disc has an aspect ratio defined as the ratio of the gauge diameter to gauge thickness of at least five.

5. A free field stress gauge as defined in claim 1 wherein the sensing means and strain gauge sensors within the stress gauge body are potted with a stabilizing material.

6. A free field stress gauge as defined in claim 1 wherein the first disc and the second disc are solid and made of high-strength steel.

7. A free field stress gauge as defined in claim 1 wherein the first disc and the second disc are made of high-strength aluminum.

8. A free field stress gauge as defined in claim 1 wherein the first disc and the second disc are made of composite material.

9. A free field stress gauge as defined in claim 1 wherein the watertight sealing means are an o-rings.

10. A free field stress gauge as defined in claim 1 wherein the watertight sealing means are copper washers.

11. A free field stress gauge as defined in claim 1 wherein the strain gauge sensor is a fiber optic strain gauge sensor.

12. A free field stress gauge as defined in claim 1 wherein the density of gauge materials selected are approximately equal to the density of the sensed medium and the materials selected have an average elastic Young's modulus in a direction of the gauge's measuring axis higher than the sensed medium whereby a very high ratio of a support area to loaded area in the direction of the gauge's measuring axis is achieved.

13. A free field stress gauge for use in stress fields in a sensed medium up to and including the ten kilobar range, comprising:

a first disc having a solid central sensing column section in direct contact with the sensed medium, an internal passage for allowing electrical sensing leads to connect with electrical strain gauge sensors mounted to the first disc, an annular void space between the central sensing column and an outer annular section whereby the annular void allows for mating of a complimentary second disc, the sensing column has surfaces for placement of the strain gauge sensors;

the second disc and the first disc have at least two mutual recesses within their structures for placement of a watertight sealing means, the second disc is fastened to the first disc by fastening means;

the number of the strain gauge sensors is four, a first and a second strain gauge sensor which sense longitudinal deformation and are of a semi-conductor strain gauge sensor type and a third and a fourth strain gauge sensor which sense circumferential deformation are of a foil strain gauge sensor type;

the first and second strain gauge sensors are positioned on flattened sections of the sensing column, the third and fourth strain gauge sensors are positioned 90 degrees relative to the first disc; and detection means for sensing any stress applied to the free field stress gauge by measuring the strain experienced by the strain gauge sensors.

* * * * *